United States Patent [19]
Bourdon et al.

[11] Patent Number: 5,737,447
[45] Date of Patent: Apr. 7, 1998

[54] DEVICE FOR HIERARCHICAL ESTIMATION OF THE MOTION OF IMAGE SEQUENCES

[75] Inventors: François Bourdon; Philippe Guillotel, both of Rennes; Jean-Yves Aubie, Ventabren, all of France

[73] Assignee: Thomson-CSF, Paris, France

[21] Appl. No.: 464,626

[22] PCT Filed: Dec. 14, 1993

[86] PCT No.: PCT/FR93/01241

§ 371 Date: Dec. 18, 1995

§ 102(e) Date: Dec. 18, 1995

[87] PCT Pub. No.: WO94/15436

PCT Pub. Date: Jul. 7, 1994

[30] Foreign Application Priority Data

Dec. 24, 1992 [FR] France .................. 92 15709

[51] Int. Cl.$^6$ .................................................. G06K 9/36
[52] U.S. Cl. ........................ 382/236; 382/240; 348/413
[58] Field of Search ........................ 382/236, 238, 382/240, 107; 348/412, 413, 415, 416, 407, 699

[56] References Cited

U.S. PATENT DOCUMENTS

| | | | |
|---|---|---|---|
| 4,849,810 | 7/1989 | Ericsson | 348/416 |
| 5,122,873 | 6/1992 | Golin | 348/390 |
| 5,296,927 | 3/1994 | Guillotel | 348/415 |
| 5,351,095 | 9/1994 | Kerdranvat | 348/413 |
| 5,414,469 | 5/1995 | Gonzalez et al. | 348/416 |
| 5,541,661 | 7/1996 | Odaka et al. | 348/416 |

*Primary Examiner*—Yon J. Couso
*Attorney, Agent, or Firm*—Oblon, Spivak, McClelland, Maier & Neustadt, P.C.

[57] ABSTRACT

The device includes a set of processing macromodules connected in cascade and organized in accordance with hierarchical levels. Each macromodule is structured so as to partition the current image into macroblocks of a determined size corresponding to its hierarchical level so as to transmit a motion vector field to the block which follows it, and includes first circuits for calculating the displaced inter-image differences DFDi and the gradients on the basis of the values of luminance of the pixels of the video image and of the displacement vectors of each image preceding or following the current image; second circuits for performing blockwise the summations of the displaced inter-image differences and third circuits for performing corrections of the displacement vectors of the image.

7 Claims, 2 Drawing Sheets

DEVICE FOR HIERARCHICAL ESTIMATION OF THE MOTION OF IMAGE SEQUENCES

BACKGROUND OF THE INVENTION

1. Field of the Invention

The present invention relates to a device for hierarchical estimation of the motion of image sequences.

It applies in particular to the production of image transmission chains with a view to reducing the bit rate of the information transmitted.

2. Description of the Background

A process and a device for estimation and hierarchical coding of motion in image sequences is known from French Patent Application No. 89 11328 filed in the name of THOMSON CONSUMER ELECTRONICS. This process is executed in accordance with several levels of processing. It includes according to a first level partitioning the current image into macroblocks of $2^{P+1}.2^{P+1}$ pixels and in determining a first motion vector field, associated with this macroblock splitting, by using an iterative and recursive estimation algorithm initialized with motion vectors estimated for the preceding image. It consists according to a second level in partitioning each of the macroblocks into quadrants and in determining, for the blocks which result from this, a second motion vector field using the same estimation algorithm but initialized with vectors from the motion field estimated at the preceding level. Then at an $i^{th}$ level, it consists in partitioning each of the blocks considered at level i−1 into quadrant and in determining, for the blocks which result from this, an $i^{th}$ motion field using the same estimation algorithm initialized with vectors from the motion field estimated at the preceding level, the minimum size blocks being blocks of $2^{I+1}.2^{I+1}$ pixels. Lastly, it includes in determining a final motion vector field from the resulting motion vector fields by choosing the least high level of splitting for which the motion vector associated with the corresponding block leads to the minimization of a criterion conveying the differences in luminance between blocks corresponding to one another in the successive images via the estimated displacement vectors.

This process makes it possible to enhance the convergence of the recursive motion estimation algorithm used and to best adapt the motion estimation algorithm to the "quadtree" type coding used subsequently to code the resulting motion field. However, execution of the temporal loop of the algorithm turns out to consume a great deal of calculation time and its implementation in an HD.MAC coder requires too large a number of electronic components to be easily integrated with this type of coder.

SUMMARY OF THE INVENTION

The object of the invention is to alleviate the aforesaid drawbacks.

For this purpose, the subject of the invention is a device for hierarchical estimation of the motion of image sequences, characterized in that it includes a set of cascaded processing macromodules and organized in accordance with hierarchical levels, each macromodule being structured so as to partition the current image into macroblocks of a determined size corresponding to its hierarchical level so as to transmit a motion vector field to the block which follows it, the device comprising first circuits for calculating displaced inter-image differences DFDi and gradients based on luminance values of pixels of a video image and displacement vectors of each image preceding or following a current image; second circuits for performing blockwise summations of the displaced inter-image differences; and third circuits for performing corrections of the displacement vectors of the image.

The main advantage of the invention is to offer a model of hardware architecture which is simpler to produce than that of the prior devices together with a sharply reduced number of processing levels and much smaller calculation times.

BRIEF DESCRIPTION OF THE DRAWINGS

Other characteristics and advantages of the invention will emerge with the aid of the description which follows given in connection with the appended figures which represent.

DETAILED DESCRIPTION OF THE PREFERRED EMBODIMENTS

Figure 1:
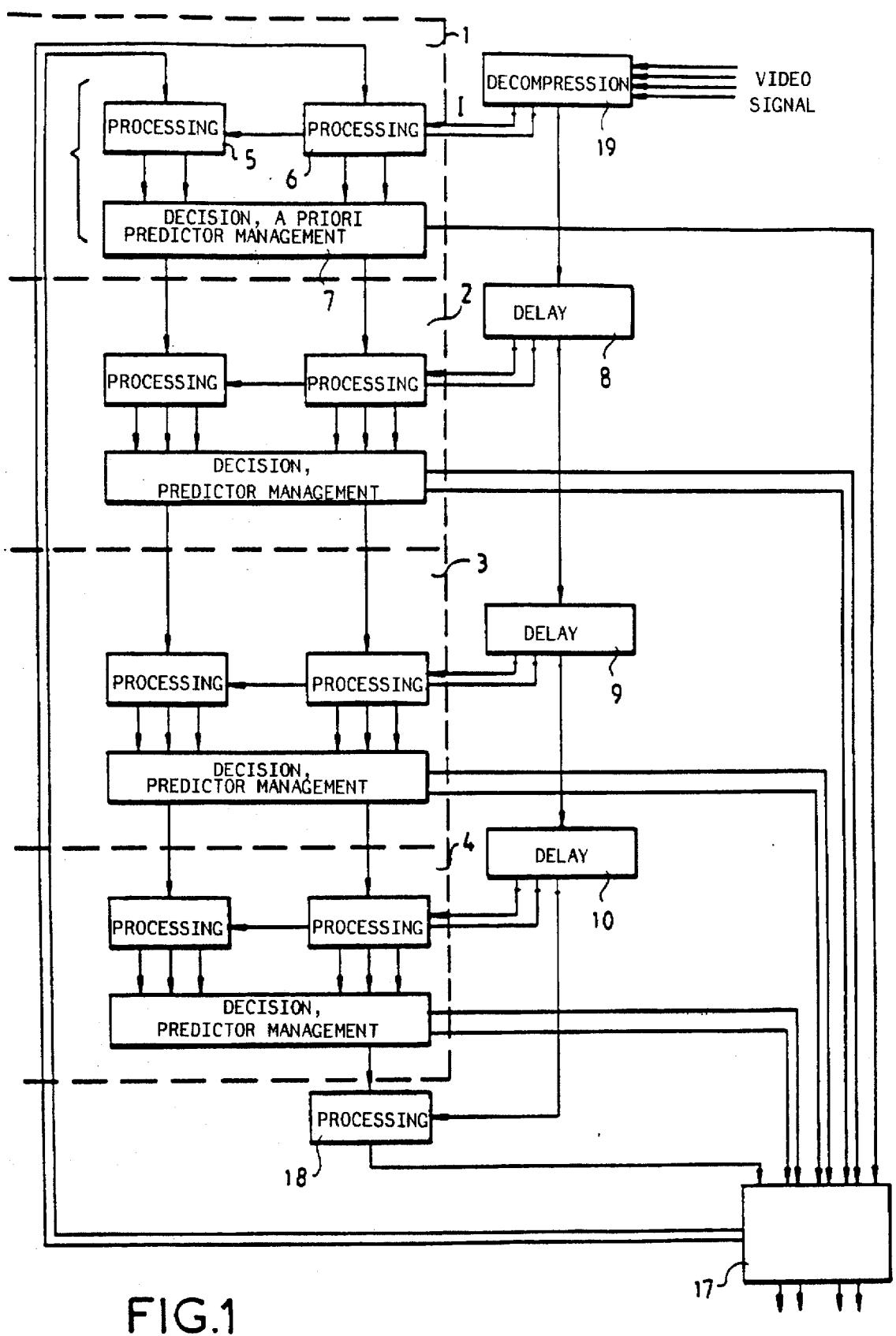
FIG. 1 an embodiment of a device for hierarchical estimation of motion according to the invention.
Figure 2:
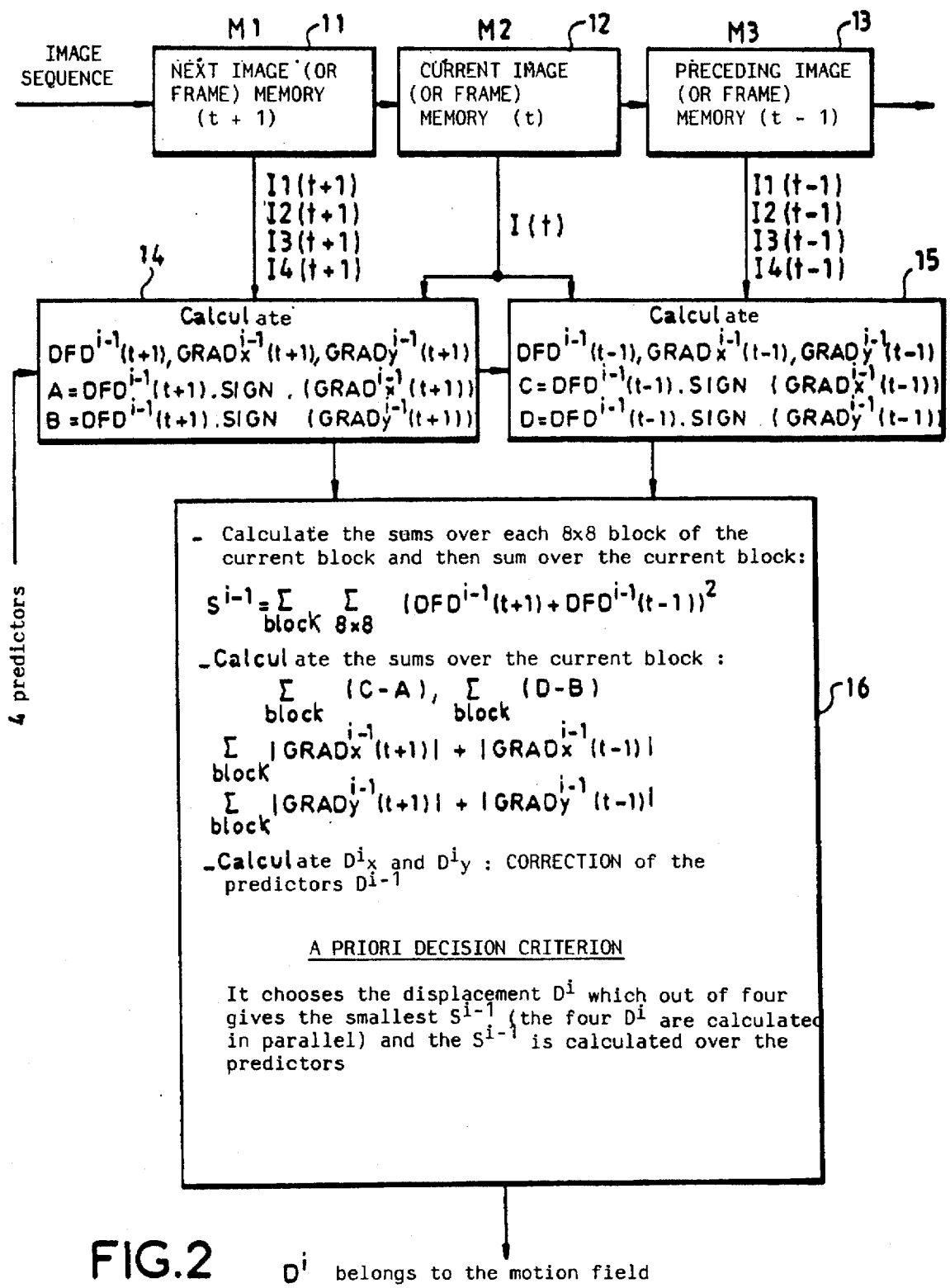
FIG. 2 an embodiment of a processing module represented in FIG. 1.

The architecture represented in FIG. 1 is adapted to those which are known from the hierarchical recursive blocks HRB of HD.MAC coders. It includes four hierarchical levels (128, 64, 32 and 16) defined by the size of partition of the blocks of the image and four predictors per level. This architecture is modular and enables the number of levels to be increased or decreased depending on the desired compromise between the accuracy of the results and the bulkiness of the hardware. The device represented includes a set of four processing macromodules referenced from 1 to 4 respectively. Each macromodule carries out the processing of a hierarchical level. They each include three modules, two processing modules 5 and 6 and one decision module 7. Delay modules 8, 9 and 10 are attached respectively to the macromodules 2, 3 and 4. Each of the processing modules carries out in parallel the correction of two predictors. The number of predictors per level can vary by using a greater or lesser number of these modules. For an HD.MAC coder for example which includes four predictors, only two processing modules are necessary. Each processing module includes in the manner represented in FIG. 2 a set of three memory blocks 11, 12 and 13, blocks 14 and 15 for calculating the displaced inter-image differences and a calculating block 16 for correcting the predictors. As represented in FIG. 2, the image sequences are stored in the three memories 11, 12 and 13 which respectively contain the next image referenced at an instant t+1, the current image referenced at the instant t, and the preceding image referenced at the instant t−1 as well as the luminance values $I_1(t+1)$, $I_2(t+1)$; $I_3(t+1)$, $I_4(t+1)$ of four pixels surrounding the displaced pixel in the next image at the output of the memory 11, the luminance value $i(t)=i(z,t)$ of the current point z at the output of the memory 12 and the luminance values $I_1(t-1)$, $I_2(t-1)$, $I_3(t-1)$ and $I_4(t-1)$ of the four pixels surrounding the displaced pixel in the preceding image at the instant t−1. A first pointwise calculation step gives the values of displaced inter-frame difference $DFD^{i-1}(t+1)$ and of gradients $GRAD_x^{i-1}$, $GRAD_y^{i-1}(t+1)$ on the basis of the luminance values coming from the memories and of the initial displacement vectors, with respect to the preceding image at the instant t−1 and with respect to the following image at the instant t+1. More specifically the block 14 calculates the values $$DFD^{i-1}(t+1), Grad_x^{i-1}(t+1), Grad_y^{i-1}(t+1)$$

$$A = DFD^{i-1}(t+1).\text{Sign}(\text{Grad}_x^{i-1}(t+1))$$

$$B = DFD^{i-1}(t+1).\text{Sign}(\text{Grad}_y^{i-1}(t+1))$$

and the block 15 calculates the values $$DFD^{i-1}(t-1), \text{Grad}_x^{i-1}(t+1), \text{Grad}_y^{i-1}(t-1)$$

$$C = DFD^{i-1}(t-1).\text{Sign}(\text{Grad}_x^{i-1}(t-1))$$

$$D = DFD^{i-1}(t+1).\text{Sign}(\text{Grad}_y^{i-1}(t-1))$$

with $DFD^{i-1} = I(z,t) - I(z-D^{i-1}, t-1)$.

The displacement vectors $D^{i-1}$ are calculated by the block 16 according to the iterative formulae:

$$D_x^i = D_x^{i-1} - \frac{\Sigma[DFD(z-D^{i-1},t-1)sg(\text{grad}^x(z-D^{i-1},t-1)) - DFD(z+D^{i-1},t+1)sg(\text{grad}^x(z+D^{i-1},t+1))]}{\Sigma[\text{grad}^x(z-D^{i-1},t-1) + \text{grad}^x(z+D^{i-1},t+1)]} \quad (1)$$

$$D_y^i = D_y^{i-1} - \frac{\Sigma[DFD(z-D^{i-1},t-1)sg(\text{grad}^y(z-D^{i-1},t-1)) - DFD(z+D^{i-1},t+1)sg(\text{grad}^y(z+D^{i-1},t+1))]}{\Sigma[\text{grad}^y(z-D^{i-1},t-1) + \text{grad}^y(z+D^{i-1},t+1)]} \quad (2)$$

in which:

$D_x^i$ and $D_y^i$ as well as $D_x^{i-1}$ and $D_y^{i-1}$ are respectively the horizontal and vertical components of the motion vectors $D^i$ and $D^{i-1}$ for a block of pixels respectively at iteration i and at the preceding iteration i–1; after having calculated the partial sums of the differences C-A and B-D over the set of the corresponding block of level n.

When the N initial values for each current block (N then generally being chosen equal to correspond to blocks in the neighbourhood of this current block but of a different level, that is to say of immediately greater size, it is possible to initialize 4 separate motion estimates for this block and give, when the iterative formulae of the algorithm have converged, four independent values of updated motion vectors. The updated motion vectors supplement the values of the vectors of preceding levels, the squares of the intermediate inter-frame differences DFD used for the updates are calculated, stored in memory and added up for the whole of the block so as to choose for each block on completion of the 4 calculations, the "best" displacement out of the four new updated displacement vectors. That is to say, the displacement for which the sum $S^i$ of the squared inter-frame differences for this block is minimal is chosen. This best vector then constitutes one of the vectors of the motion field calculated at level n and denoted DV128 or DV64 or DV32 or DV16 depending on the iteration level.

The block 16 can also be organized in such a way as to carry out an a priori calculation. In this case the block 16 directly applies to the N initial values used for each current block a decision criterion by using a DFD calculation and by choosing as a vector the one which gives the minimum DFD. It carries out a correction on this chosen vector in such a way as to obtain the components of the displacement vector $D_x^i$ and $D_y^i$ with the iterative values given above. Calculation of the sums is performed over each 8×8 block of the current block, and then a sum over the current block is performed according to the relation $$S^{i-1} = \sum_{\text{bloc } 8 \times 8} \sum |DFD^{i-1}(t-1) + DFD^{i-1}(t-1)|^2$$

($DFD^{i-1}$ being the DFD calculated with the vectors $D^{i-1}$ as for $\text{Grad}^{i-1}$).

The block 16 next performs the calculation of the sums over the current block and the calculation of $D_x^i$ and $D_y^i$, namely the correction of the predictors $D^{i-1}$.

On completion of this motion estimation phase, a different motion vector field corresponding to each level, that is to say to each block size, is available in order to determine the final motion field adapted to the construction of the coding tree such as a "quadtree" type coding tree.

Having determined the four motion fields, the convergence step consists in determining in a block referenced by 17 in FIG. 1 the final field of motion. Determination of the final field of motion takes place by examining for each block of minimum size, namely, for each block of size 16×16 pixels in the embodiment represented, the different motion-vectors DVI which were established at each level of splitting. Thus, for each block of minimum size, we have a vector DV128 giving a DFD 128 established when initializing the procedure, namely at level 1 then a vector DV64 giving a DFD 64 established at level 2, a vector DV32 giving a DFD 32 established at level 3, and a vector DV16 giving a DFD 16 established at level 4. Thus, for these four vectors, the block 17 compares their DFD and chooses the vector DVI giving the smallest DFDi as vector assigned to this block of minimum size in the final motion vector field. This same selection is made for all the blocks of size 16×16 of a macroblock.

The various processing modules can be made with the aid of three types of ASIC, one calculating the inter-displaced differences DFD and the gradients in the video signal, the second performing the blockwise summation of the displaced inter-image differences and the third performing a division of high precision for the correction of the predictor. The attraction of this partition resides in that the ASICs of type 1 and 3 need only very little memory hereas the ASIC of type 2 requires a lot. The problems of production, design, testing add consumption are then split up better. However, it is conceivable that in the near future these three types could be merged into one. The reduction in the bulkiness of this very repetititve part then leads to a not insignificant reduction in the device as a whole.

To avoid the random accessing of the values of the pixels in the preceding and succeeding images for the DFD and gradient calculations being a very memory-expensive operation, a first solution could consist in using four simple circuits providing the four values of the pixels of the grid cell at spot frequency. This makes it possible to have just one channel per predictor, each channel working in parallel. An improvement can also consist of using circuits providing several points of a window pointed at by the predictor, and hence several grid cells in one go. By processing N points in one go (providing N DFDs and N gradients), it is then possible to use the same circuit for N–1 other predictors. Which amounts to saying that through this improvement which is no more expensive in memory, it is possible to carry out the random accessing of several predictors in series and not in parallel, this significantly reducing the bulkiness.

The architecture has another advantage for the calculation of the sums of displaced inter-image differences DFDi depending on the levels i 128, 64, 32 and 16 calculated for each block of size 16×16 of a macroblock. Indeed, in the case of a priori calculation the decisions are made by comparing the sums S(i–1), that is to say the sums of DFDi calculated over the predictors, whereas for convergence, the decision is made by comparing the sums S(i), that is to say the sums of DFDi calculated over the vectors summed over blocks of size 16×16 whatever the hierarchical level. In order not to recalculate the sums S(i) from the vectors, the device makes it possible to define the predictors of each level i on the basis of the vectors of level i−1. Thus by performing the sums over blocks of size 16×16 whatever i, the displaced inter-image differences DFDi over the predictors this amounts to calculating directly the sums utilized for the convergence of level i−1 with a very small hardware cost. In an HD.MAC application the sums S(i) 128 are calculated at level 64, the sums S(i) 64 are calculated at level 32, the sums S(i) 32 are calculated at level 16, and the sums S(i−1) 16 are then calculated with a further processing module represented with the reference 18 in FIG. 1, only one channel of which is rigged up. Given that it is the decision module which receives the information originating from the processing modules it is circumspect to use it both to generate predictors of succeeding levels and to provide on convergence the vectors of the i and the sums S(i−1). The delay modules 8, 9 and 10 essentially consist of memories for producing the delays for compensating the video signal so as to deliver it correctly in phase to the various hierarchical levels. These modules can be cascaded to allow delay compensation on a single hierarchical level. Moreover, a delay module 19 is placed at the head of the processing module 1 so as to perform at the head of the system an expansion consisting in doubling the duration of a video line and hence doubling the duration of a frame in the case where the motion field is calculated only every second image as is the case with HD.MAC. This expansion makes it possible to halve the processing frequency of the whole of the remainder of the device.

We claim:

1. A device for hierarchical estimation of the motion of image sequences, comprising:

a set of cascaded processing macromodules organized in accordance with hierarchical levels, each macromodule of said set of cascaded macromodules being structured so as to partition a current image into blocks of a determined size, a size corresponding to a hierarchical level in order to provide a motion vector field to a block of a lower hierarchical level corresponding to a lower size, first circuits for calculating a displaced inter-image differences DFDi and gradients based on luminance values of pixels of the current image and of displacement vectors of each image preceding and following the current image;

second circuits for performing summations, on a block, of the displaced inter-image differences; and third circuits for performing corrections of the displacement vectors of the current image.

2. The device according to claim 1, wherein said each macromodule comprises at least one processing module and a decision module coupled to the at least one processing module.

3. The device according to claim 2, wherein each processing module comprises means for correcting at least two predictors.

4. The device according to any one of claims 1 to 3, wherein each macromodule comprises means for summing the displaced inter-image differences of a hierarchical level and for transmitting, to the macromodule of a corresponding lower hierarchical level, the summed displaced inter-image differences.

5. The device according to any one of claims 1 to 3, wherein the set of cascaded macromodules comprise means for randomly accessing gridded blocks of predictors in the preceding and succeeding images in parallel with an access to the grid cells alone.

6. The device according to claim 4, wherein the set of cascaded macromodules comprise means for randomly accessing gridded blocks of predictors in the preceding and succeeding images in series with an access to a more extensive window.

7. The device according to claim 1, wherein the second circuits comprise a summation circuit for calculating a sum for an i-th hierarchical level at an $(i-1)^{th}$ hierarchical level.

* * * * *